Figure 1:
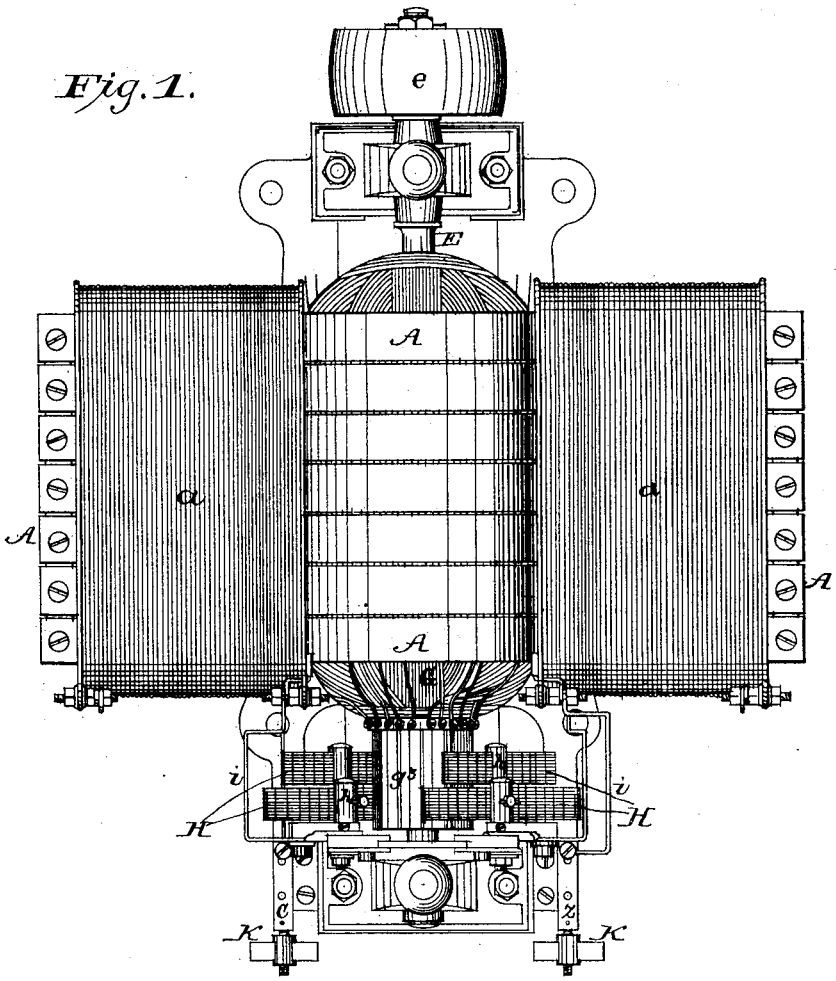

(No Model.) 2 Sheets—Sheet 1.

F. VON HEFNER-ALTENECK.

DYNAMO ELECTRIC MACHINE.

No. 256,081. Patented Apr. 4, 1882.

WITNESSES INVENTOR

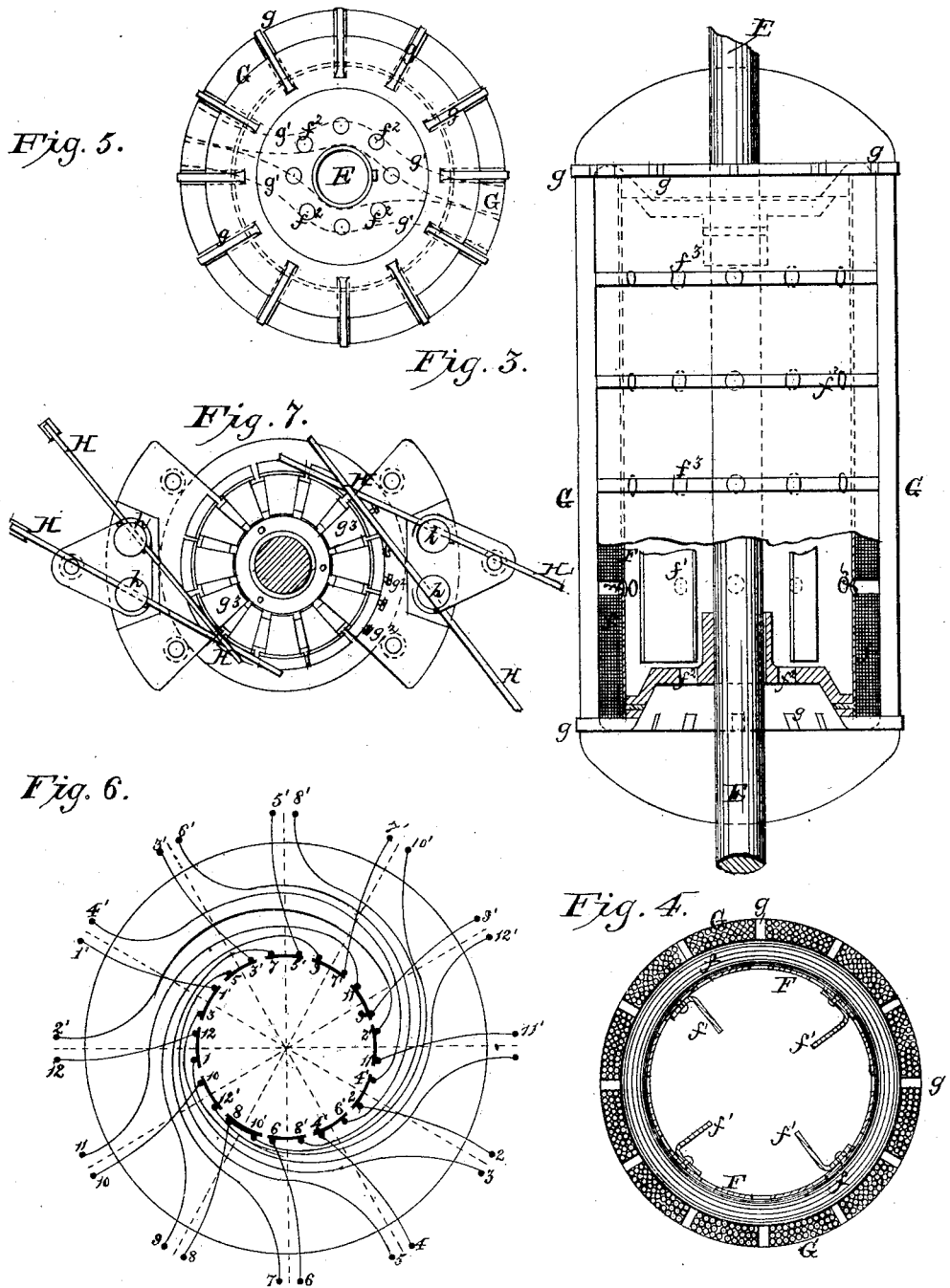

UNITED STATES PATENT OFFICE.

FRIEDRICH VON HEFNER-ALTENECK, OF BERLIN, GERMANY.

DYNAMO-ELECTRIC MACHINE.

SPECIFICATION forming part of Letters Patent No. 256,081, dated April 4, 1882.

Application filed January 14, 1882. (No model.) Patented in England June 5, 1873.

*To all whom it may concern:*

Be it known that I, FRIEDRICH VON HEFNER-ALTENECK, a subject of the King of Bavaria, residing at Berlin, in the Empire of Germany, have invented certain new and useful Improvements in Dynamo-Magneto-Electric Machines; and I do hereby declare the following to be a full, clear, and exact description of the invention, such as will enable others skilled in the art to which it appertains to make and use the same.

My invention relates to a dynamo-electric machine in which part of the electric current is made to move within a magnetic field in such a manner as to cut the lines of magnetic force, and thereby induce a current of electricity in the circuit; and the nature of my invention consists in arranging in such a machine upper and lower sets or series of curved bars in such a manner as to form an intense magnetic field within the cylindrical space between them, within which may be revolved an armature or induction-cylinder.

It also consists in arranging the said bars with passages between them for the purpose of reducing the accumulative heating of the machine by the circulation of air between the revolving armature and the magnets; and, finally, it consists in so constructing the various parts of the machine that it shall be of small size and weight in proportion to its power.

In the machine containing these improvements the revolving conductor in which the electric current is induced consists of insulated wire wound longitudinally on a cylindrical armature in such a manner as to entirely envelop it.

The method of winding the insulated wire upon the cylinder is not herein claimed, as it forms the subject-matter of another division of this application for Letters Patent of the United States, which was filed on the 22d day of January, 1879; but in order that the operation of the machine may be clearly understood, it may be mentioned that the wire is wound in sections, each of which is substantially parallel to a different plane passing longitudinally through the axis of the cylinder, and that the ends of these coils are connected to a number of insulated sectors, which together form a cylindrical commutator attached to and revolving with the armature-spindle.

The magnetic field within which the system above described revolves is produced by a series of electro-magnets having coils which consist of long flat bobbins wound with insulated wire, and curved bars of rectangular section having air-spaces between them, which bars are the prolongations of the cores of the electro-magnets. Each set of magnets is wound in such a manner as to produce a pole in the center of its length, a north pole being produced in one set and a south pole in the other, and thus an intense magnetic field is formed within the cylindrical space included between the lower and upper set. When motion is imparted to the machine by any proper motor the residual magnetism of the magnet-cores and inductive effect of terrestrial magnetism induce in the wire on the revolving armature a current of electricity sufficiently strong to traverse the coils of the electro-magnets and increase their magnetic intensity and the intensity of the magnetic field, the effect of which is the induction of a stronger current in the coils of the revolving armature, which being transmitted through the magnet-coils increases to a still greater extent the magnetism of the cores and the intensity of the magnetic field. The induced current thus becomes stronger and stronger, the only limitation upon the increase of strength of the magnetic field being the magnetic saturation of the soft-iron magnets.

The construction and operation of my improved machine will be understood by reference to the accompanying drawings, of which—

Figure 2:
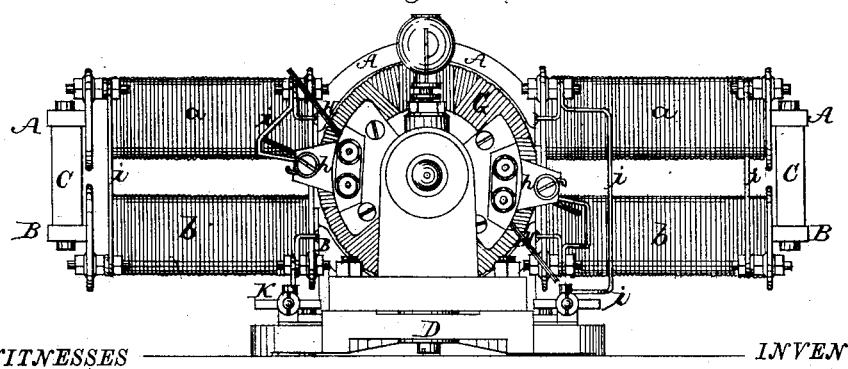

Figure 1 represents a plan, and Fig. 2 an end view, of the complete machine. Fig. 3 is a plan, partly in section, of the internal rotating cylinder. Fig. 4 is a transverse section, and Fig. 5 a view of the back end of the same. Fig. 6 is a diagrammatic view of the front end thereof, showing the connections of the conducting-wires to the rotating commutator, a section of which, with the conducting-brushes applied thereto, is shown by Fig. 7.

A number of bars of soft iron, A, bent upward to a circular curvature in the middle, and a corresponding number of similar bars, B, bent downward in the middle, are secured to each other by iron struts C and to a base, D. Insulated conducting-wires $a$ are coiled around the upper bars, A, and similar wires, $b$, are coiled round the lower bars, B, these coils being connected and the coiling so arranged that when a current of electricity is transmitted through the coils the bars become magnetic, the middle curved parts, A and B, becoming oppositely polar—that is to say, the one being a north and the other a south pole.

Between the curved portions of the bars A and B is a rotating cylinder or armature fixed on a shaft, E, which is mounted in bearings and caused to rotate rapidly by a strap driving the pulley $e$, or otherwise. The cylinder consists of a thin shell, F, of non-magnetic material—such as brass—on which are wound soft-iron wires $f$, forming an annular cylinder, or a number of successive rings along the cylindrical shell. The cylinder might, however, be made simply of soft iron in annular form; but the wire construction above mentioned is preferred, because when iron is in the form of wire the magnetic induction thereupon is more rapid and complete.

For the purpose of cooling the machine while it is at work vanes $f'$ are fixed inside the cylindrical shell, and holes $f^2 f^3$ bored through its ends and periphery respectively, so that when the cylinder is rapidly rotating currents of air are made to enter by the holes $f^2$ and issue by the holes $f^3$.

On the outer periphery of the cylinder insulated conducting-wires G are wound lengthwise of the cylinder in an even number of groups (of which twelve are shown in the figures) kept separate by radial projections $g$ at each end of the cylinder. In each group there are preferably two or other even number of wires coiled, the convolutions of which at the ends of the cylinder bend round to clear the shaft E, as indicated by the line $g'$ in Fig. 5, which shows the course taken by the convolutions belonging to two opposite groups. The terminals of these wires are at the front end of the cylinder secured by screws $g^2$ respectively to insulated plates $g^3$ of a rotating commutator, which consists of these plates (one for each group of wires) arranged cylindrically round the shaft E, the connections of the several wires to these plates being arranged in the manner indicated by the diagram, Fig. 6, in which the one terminal of each coil is marked by a numeral and the other terminal of the same coil is marked by the same numeral with a dash—as, for example, 8 and 8'.

Two pairs of wire brushes, H, bear upon the surface of the plates $g^3$, and these brushes are fixed upon insulated supports $h$, which are connected by conducting-wires $i$ respectively through the coils $a$ and $b$ to the two insulated terminals K K. As the cylinder is caused to rotate each successive portion of its periphery as it passes through the polar fields of A and B has magnetism induced upon it, and this causes electric currents to flow along the wires of the successive coils G. These currents being transmitted to plates $g^3$ are successively carried by the metallic brushes H H and the conductors I through the coils $a$ and $b$, increasing the magnetism of the bars A and B, and from the coils to the positive and negative terminals K K, whence they can be conducted away to be used for any purpose to which electricity is applicable.

The mode of winding the wires G on the cylinder may be varied, as persons practiced in the art will readily understand. For example, instead of winding them in twelve groups, as shown in the drawings, they may be wound in any other even number of groups, the number being necessarily even, because the wire extends from front to back along the opposite division.

One method of winding a single line of wire which I find advantageous in practice is as follows: I wind the wire to and fro along one of the divisions and its opposite to half the depth to which the wire is intended to be wound, and then attach a loop of the wire to a plate of the commutator. I continue to wind the wire in the same manner along the next division and its opposite; again, I secure a loop to the next plate of the commutator, and so on I proceed till all the divisions have received half their quantity of wire. I then repeat a similar succession of windings along the successive divisions, so filling them up with the whole quantity of wire, and at the end of the winding I join the end of the wire to its beginning and connect both to the last of the commutator-plates.

Instead of securing a loop to the commutator-plate, as above described, about midway in the winding, several such loops may be so secured in the course of the winding over each pair of divisions, and in that case the commutator will have an increased number of plates, one for each such loop. This subdividing of the commutator is of advantage, as there are fewer sparks produced for a given number of wire convolutions.

When the machine is to be applied to circuits presenting a small resistance—as, for example, for electrotypical purposes—the wire may be of large size with fewer convolutions—such, for instance, as will give only one layer on the surface of the cylinder. Such wire may be wound, as above described, in two half portions, the second portion occupying space at the side of the first portion without overlying it.

I do not claim herein the arrangement of the convolutions of the cylinder-coils to the separate plates of the commutator in the manner shown and described, as that subject-matter is claimed in another division of this application, known as "Division A," which was filed in the United States Patent Office on the 22d day of January, A. D. 1879; but

What I claim, and desire to secure by Letters Patent, is—

1. The curved bars A and B, with coils $a$ $a$ and $b$ $b$ arranged on each side of the central pole constituting the electro-magnets of a dynamo-electric machine, as and for the purposes described.

2. The curved bars A and B, with coils $a$ $a$ and $b$ $b$ arranged on each side of the central pole constituting the electro-magnets of a dynamo-electric machine, in combination with an armature capable of revolving within the cylindrical space between the magnets, whereby a circulation of air is caused between the revolving armature and the magnets, and cross-currents are prevented.

FRIEDRICH VON HEFNER-ALTENECK.

Witnesses:
BERTHOLD ROI,
M. S. BREWER.